US006686873B2

(12) United States Patent
Patel et al.

(10) Patent No.: US 6,686,873 B2
(45) Date of Patent: Feb. 3, 2004

(54) FARFIELD CALIBRATION METHOD USED FOR PHASED ARRAY ANTENNAS CONTAINING TUNABLE PHASE SHIFTERS

(75) Inventors: Jaynesh Patel, Columbia, MD (US); Cornelis Frederick du Toit, Ellicott City, MD (US); Vincent G. Karasack, Ellicott City, MD (US)

(73) Assignee: Paratek Microwave, Inc., Columbia, MD (US)

( * ) Notice: Subject to any disclaimer, the term of this patent is extended or adjusted under 35 U.S.C. 154(b) by 0 days.

(21) Appl. No.: 10/223,576

(22) Filed: Aug. 19, 2002

(65) Prior Publication Data

US 2003/0038746 A1 Feb. 27, 2003

Related U.S. Application Data

(60) Provisional application No. 60/314,369, filed on Aug. 23, 2001.

(51) Int. Cl.[7] ............................ G01S 7/40; H01Q 3/26; H01Q 3/30

(52) U.S. Cl. ....................... 342/174; 342/165; 342/173; 342/195; 342/368

(58) Field of Search .............................. 455/67.1, 67.4; 342/165–175, 195, 359, 360–384

(56) References Cited

U.S. PATENT DOCUMENTS

| | | | | |
|---|---|---|---|---|
| 5,294,934 A | | 3/1994 | Matsumoto | 342/173 |
| 5,861,843 A | * | 1/1999 | Sorace et al. | 342/372 |
| 5,929,809 A | | 7/1999 | Erlick et al. | 342/372 |
| 6,084,545 A | | 7/2000 | Lier et al. | 342/360 |
| 6,157,343 A | | 12/2000 | Andersson et al. | 342/371 |
| 6,208,287 B1 | | 3/2001 | Sikina et al. | 342/174 |
| 6,236,839 B1 | | 5/2001 | Gu et al. | |
| 6,507,315 B2 | * | 1/2003 | Purdy et al. | 342/374 |
| 6,538,603 B1 | * | 3/2003 | Chen et al. | 342/372 |

FOREIGN PATENT DOCUMENTS

| | | |
|---|---|---|
| GB | 2 171 849 A | 9/1986 |
| WO | WO 00/67343 | 11/2000 |

OTHER PUBLICATIONS

Specification of application 09/621,183, filed Jul. 21, 2000.

PCT International Search Report for International Application No. PCT/US02/26959 dated Dec. 5, 2002.

Tanaka M. et al. "On–Orbit Measurement of Phased Arrays in Satellites by Rotating Element Electric Field Vector Method" Electronics & Communications in Japan, Part I vol. 81, No. 1, 13 pages, 1998.

EPO Abstract of Japanese Patent Publication JP 03165103.

* cited by examiner

*Primary Examiner*—Bernarr E. Gregory
(74) *Attorney, Agent, or Firm*—Robert P. Lenart

(57) ABSTRACT

A method for calibrating a phased array antenna and the calibrated phased array antenna are described herein. In the preferred embodiment of the present invention, the method for calibrating a phased array antenna containing a plurality of electronically tunable phase shifters each of which is coupled to a column of radiating elements includes the steps of: (a) characterizing, without having any prior phase shift versus tuning voltage data, each of the electronically tunable phase shifters; (b) calculating phase offsets for each column of radiating elements using a farfield antenna range and the characterized data for each of the electronically tunable phase shifters; and (c) using the calculated phase offsets in a calibration table to adjust the tuning voltage of each of the electronically tunable phase shifters to cause the columns of radiating elements to yield a uniform beam.

20 Claims, 2 Drawing Sheets

FARFIELD CALIBRATION METHOD USED FOR PHASED ARRAY ANTENNAS CONTAINING TUNABLE PHASE SHIFTERS

CLAIMING BENEFIT OF PRIOR FILED PROVISIONAL APPLICATION

This application claims the benefit of U.S. Provisional Application Serial No. 60/314,369 filed on Aug. 23, 2001 and entitled "Farfield Calibration Method Used For Electronically Scanning Antennas Containing Tunable Phase Shifters" which is incorporated by reference herein.

BACKGROUND OF THE INVENTION

1. Field of the Invention

This invention relates to antennas, and more particularly to a method for calibrating a phased array antenna and a calibrated phased array antennas.

2. Description of Related Art

Microwave terrestrial and satellite communications systems are rapidly being deployed to serve communications needs. In these systems, to ensure a radio communication link between a fixed station on the ground or on a satellite and a mobile station such as an automobile or airplane, antenna systems with scanning beams have been put into practical use. A scanning beam antenna is one that can change its beam direction, usually for the purpose of maintaining a radio link, e.g. to a tower or satellite, as a mobile terminal is moving and changing direction. Another application of a scanning beam antenna is in a point-to-multipoint terrestrial link where the beams of a hub antenna or remote antenna must be pointed in different directions on a dynamic basis.

Early scanning beam antennas were mechanically controlled. The mechanical control of scanning beam antennas have a number of disadvantages including a limited beam scanning speed as well as a limited lifetime, reliability and maintainability of the mechanical components such as motors and gears.

Electronically controlled scanning beam antennas are becoming more important with the need for higher speed data, voice and video communications through geosynchronous earth orbit (GEO), medium earth orbit (MEO) and low earth orbit (LEO) satellite communication systems and point-to-point and point-to-multipoint microwave terrestrial communication systems. Additionally, new applications such as automobile radar for collision avoidance can make use of antennas with electronically controlled beam directions.

Phased array antennas are well known to provide such electronically scanned beams and could be an attractive alternative to mechanically tracking antennas because they have the features of high beam scanning (tracking) speed and low physical profile. Furthermore, phased array antennas can provide multiple beams so that multiple signals of interest can be tracked simultaneously, with no antenna movement.

In typical embodiments, phased array antennas incorporate electronic phase shifters that provide a differential delay or a phase shift to adjacent radiating elements to tilt the radiated phase front and thereby produce farfield beams in different directions depending on the differential phase shifts applied to the individual elements or, in some cases, groups of elements (sub-arrays). Of course, there is a need to efficiently and effectively calibrate phased array antennas and, in particular, there is a need to efficiently and effectively calibrate phased array antennas that incorporate voltage tunable dielectric phase shifters. This need and other needs are satisfied by a method for calibrating a phased array antenna and a calibrated phased array antenna of the present invention.

BRIEF DESCRIPTION OF THE INVENTION

The present invention includes a method for calibrating a phased array antenna and a calibrated phased array antenna. In the preferred embodiment of the present invention, the method for calibrating a phased array antenna containing a plurality of electronically tunable phase shifters includes the steps of: (a) positioning an RF receiver away from the phased array antenna such that the RF receiver can receive energy emitted from the phased array antenna; (b) setting each of the plurality of electronically tunable phase shifters in the phased array antenna to a random phase; (c) successively applying a plurality of tuning voltages to a first one of the phase shifters coupled to a first column of radiating elements in the phased array antenna to control the phase shift provided for the first column of radiating elements; (d) measuring the phase and amplitude of a signal transmitted from the first column of radiating elements in the phased array antenna to the RF receiver for each tuning voltage applied to the first phase shifter; (e) determining the phase shift versus tuning voltage data for the first column of radiating elements; (f) repeating steps (b), (c), (d) and (e) for each column of radiating elements of the phased array antenna; and (g) using the determined phase shift versus tuning voltage data to adjust the phase shift for each of the phase shifters to yield a uniform phase front at an aperture of the phased array antenna.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
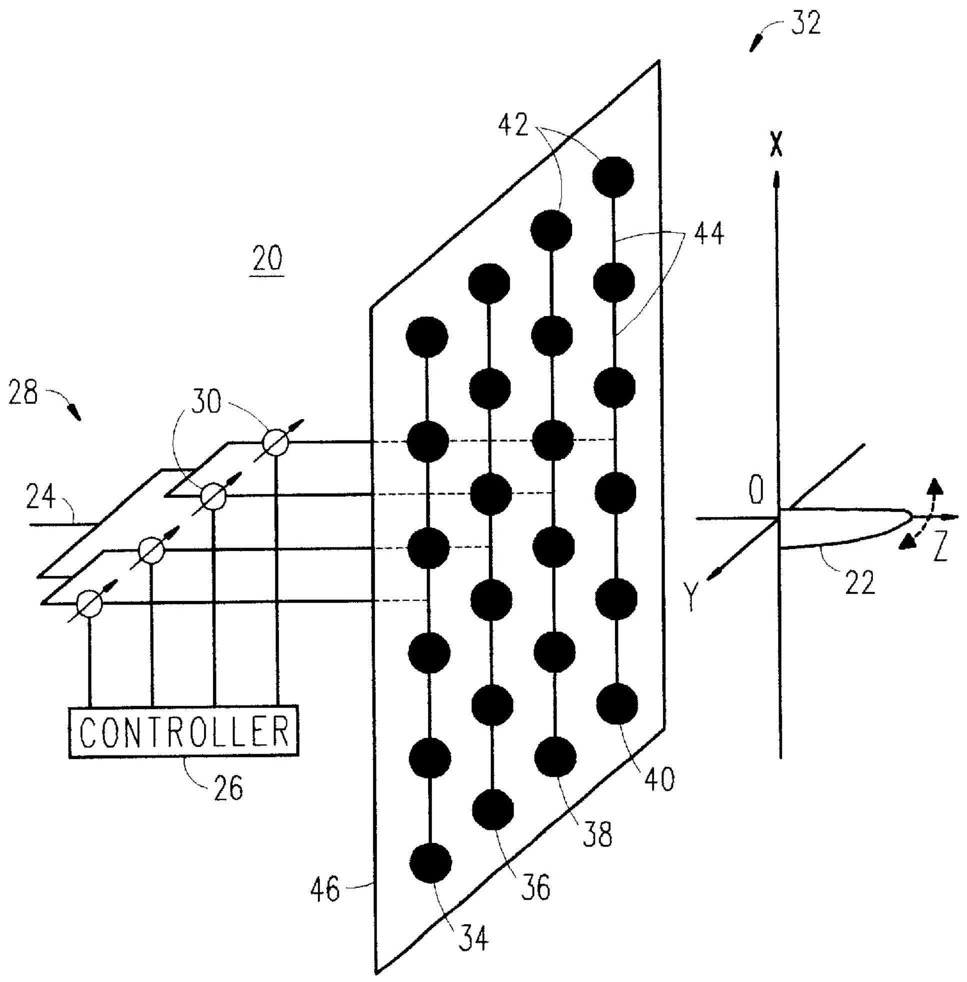
FIG. 1 is a schematic representation of a one-dimensional scan phased array antenna that can be calibrated in accordance with the method of the present invention.

Referring to the drawings, FIG. 1 is a schematic representation of an one-dimensional scan phased array antenna 20 that can be calibrated in accordance with the present invention. The antenna 200 scans a radiating beam 22 in a horizontal direction by electronically changing the phase of the electromagnetic energy supplied to the individual sub-arrays of radiating elements 34, 36, 38 and 40.

The one-dimensional scan phased array antenna 20 of FIG. 1 includes an RF signal input port 24, a controller 26 that can be a computer, a feeding system 28, a phase control means including a plurality of phase shifters 30 (four shown), and a radiating element array 32. The radiating element array 32 includes a plurality of sub-arrays 34, 36, 38 and 40. Each sub-array 34, 36, 38 and 40 includes a plurality of radiating elements 42 that are arranged in a column, connected by feed lines 44, and mounted on a grounded low loss dielectric substrate 46.

For each sub-array 34, 36, 38 and 40 in the radiating element array 32, the phase can be controlled to get a desired radiation beam 22 in the plane normal to the sub-array, i.e. the y-z plane. In FIG. 1 the radiation beam 22 is changeable in y-z plane. The radiation beam 22 can change its beam direction electronically in the y-z plane with a fixed designed pattern in the x-z plane, for example, cosecant-square and pencil beam patterns.

The number of sub-arrays 34, 36, 38 and 40 in radiation element array 32 is the same as the number of phase shifters 30. The distance between two adjacent sub-arrays 34, 36, 38 and 40 should be in the range of 0.5 to 1 of the working wavelength of the signals to be transmitted and/or received by the antenna 20 for the purpose of getting high gain without grating lobes. To achieve the desired spacing of the radiating elements 42, the phase shifters 30 are not located in the plane occupied by the radiating elements 42. Every input port of the sub-array 34, 36, 38 and 40 in radiating element array 32 should have a good RF impedance match with every phase shifter 30 through RF lines, such as micro strip lines, cables, strip lines, fin-lines, co-planar lines, waveguide lines, etc.

By electronically adjusting the phase and amplitude of the signal that is fed to every sub-array 34, 36, 38 and 40, a tunable radiation pattern 22 can be obtained in the y-z plane (horizontal) like the one shown in FIG. 1.

The one-dimensional scan phased array antenna 20 that is described above has a radiation pattern 22 with a fixed beam shape and width in one plane (for example, the vertical plane) and scanning radiation beam in another plane (for example, the horizontal plane). This one-dimensional scan phased array antenna 20 can be used in microwave terrestrial wireless communication systems and satellite communications systems. The antenna 20 of FIG. 1 is more fully described in commonly owned co-pending application Ser. No. 09/621,183, which is hereby incorporated by reference.

Figure 2:
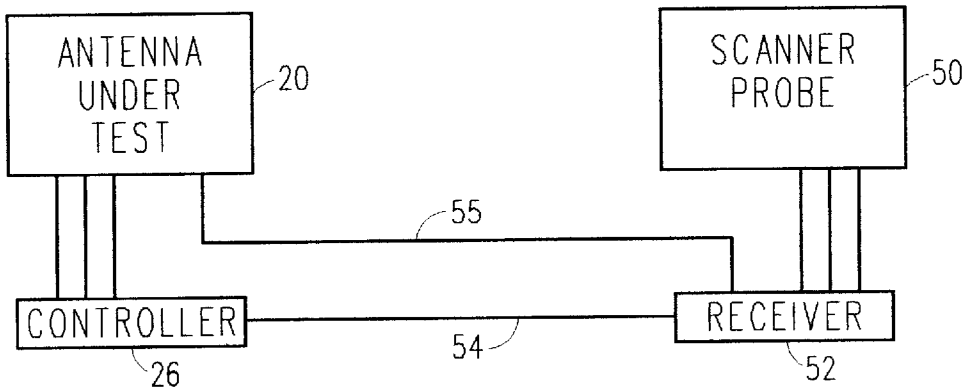
FIG. 2 is a block diagram of the components used in a system that uses the calibration method of the present invention.

FIG. 2 is a block diagram of the components of a system that uses the calibration method of the present invention. An antenna 20 is positioned in a farfield test range and aligned toward a farfield scanner probe 50. The controller 26, which can be a computer, is used to apply tuning control voltages to the voltage tunable phase shifters 30. A receiver 52 receives the signals that are detected by the scanner probe 50. The receiver 52 can communicate with the controller 26, as illustrated by line 54, and with the phased array antenna 20 under test as shown by line 55.

Figure 3:
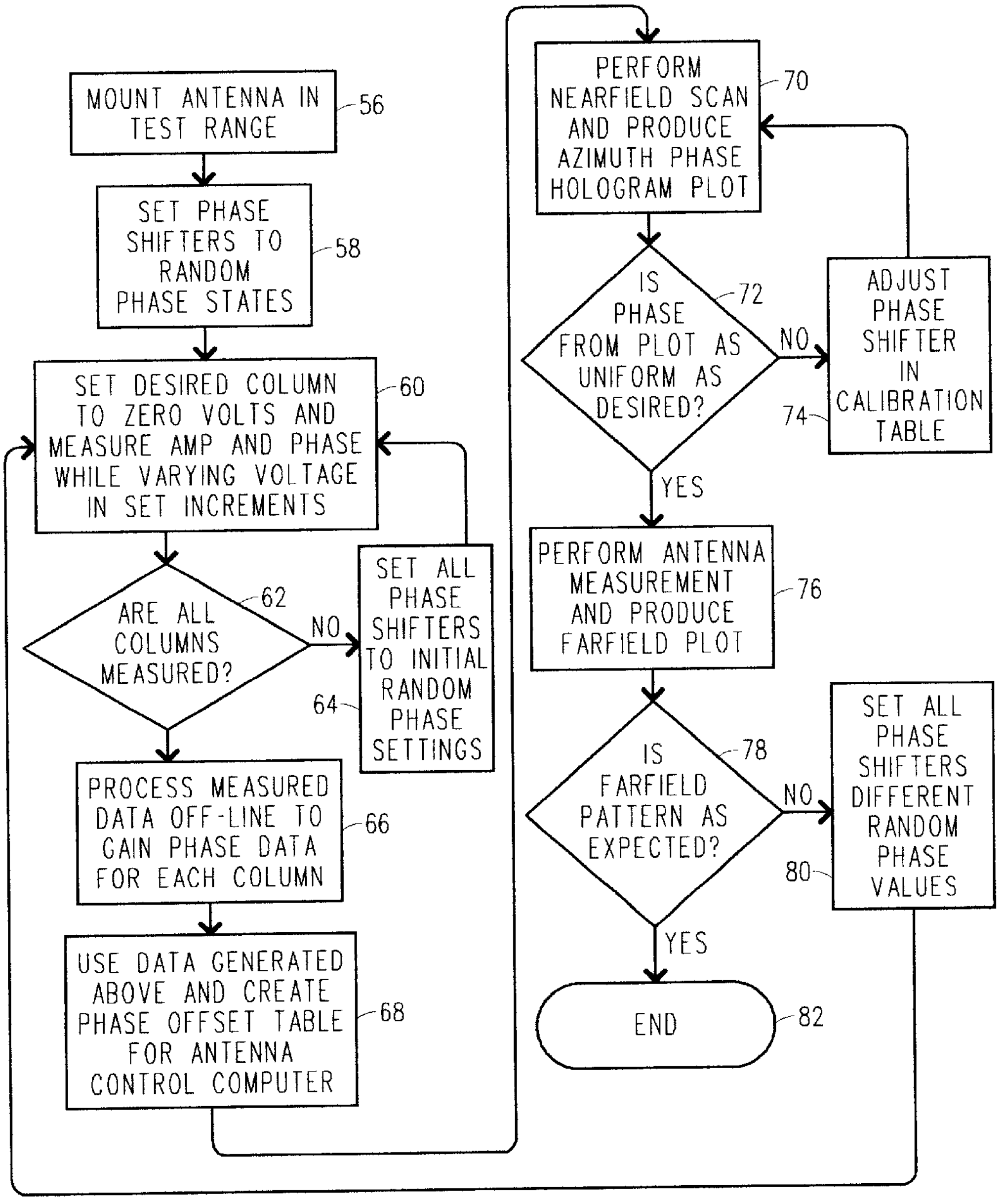
FIG. 3 is a flowchart illustrating the steps of the preferred calibration method of the present invention.

FIG. 3 is a flow chart of the steps used in an antenna calibration procedure that includes the method of the present invention. First, the antenna 20 is mounted in a farfield test range as shown in block 56. All of the phase shifters 30 are then set to a random phase as shown in block 58. This can be accomplished by setting the controller 26 to deliver random tuning voltages to the voltage tunable dielectric phase shifters 30. Block 60 shows that the tuning voltage for the phase shifter 30 coupled to a first column of radiating elements 34, 36, 38 and 40 is initially set to zero and the amplitude and phase of the signals detected by the scanner probe 50 are measured as the tuning voltage is changed in set increments. Initial measurements are made at the first column of radiating elements 34, 36, 38 and 40. Block 62 shows that a test is done to determine if all columns of radiating elements 34, 36, 38 and 40 have been tested. If not, the phase shifts for all phase shifters 30 are again set to initial random setting as shown in block 64, and measurements are made for another column of radiating elements 34, 36, 38 and 40.

When the last column of radiating elements 34, 36, 38 and 40 has been measured, the measured data is processed to determine phase data for each column of radiating elements 34, 36, 38 and 40 and the data is used to create a phase offset table for use by the controller 26, as shown in blocks 66 and 68. Next, a nearfield scan can be conducted and an azimuth phase hologram plot produced as shown in block 70. If the azimuth phase hologram plot does not meet desired uniformity criteria, as shown in block 72, the phase shifter values in the phaseoffset table would be adjusted as shown in block 74. If the azimuth phase hologram plot meets the desired uniformity criteria, a farfield measurement can be made to produce a farfield plot, as shown in block 76.

If the farfield plot does not meet desired uniformity criteria, as shown in block 78, the phase shifters 30 can again be set to different random values, as shown in block 80, and the process in block 60 would be repeated. If the farfield plot meets the desired uniformity criteria, the calibration process would be terminated as shown in block 82.

It should be understood that the present invention is not limited to the particular antenna 20 shown in the drawings. For example, antennas containing other arrangements of tunable phase shifters and other well-known radiating elements such as printed dipole elements, slot elements, waveguide elements, and helical elements can also be calibrated using this invention.

As can be seen from above, this invention provides a method for calibrating a scanning antenna 20 containing tunable phase shifters 30 without having prior phase shift versus voltage data. The method uses a farfield measurement topology. The phase shifters 30 are set such that a uniform phase is applied across all radiating elements 42 in order to yield a desired boresight beam. Calibration in accordance with the invention can provide complete characterization of the phase shifters 30, individual phase offsets for each column of radiating elements 34, 36, 38 and 40, and final boresight beam coherence.

The phased array antenna 20 is assembled and mounted on a farfield antenna range with a scanner probe 50 positioned across from the antenna 20 to be calibrated. Random phase settings are applied to the phase shifters 30 and measurements are made while varying the phase shift of a signal for the column of antenna radiating elements 34, 36, 38 and 40 under test in discrete steps. Results from this measurement for each phase shifter 30 are then used to generate an offset table that can be integrated in the antenna control algorithm. A final antenna measurement can be taken showing the desired farfield antenna pattern, verifying the calibration method.

Again, this invention provides a method for calibrating scanning antennas 20 containing electronically tunable dielectric phase shifters 30 utilizing a farfield antenna range without having a priori shifter phase-voltage information. The method includes the step of making a single column phase measurement using an antenna range. A receiver 52 (network analyzer) is preferably set for high sensitivity phase and amplitude measurements. The scanner probe 50 (receive antenna) is positioned far enough away from the antenna 20 such that it can receive energy emitted form the entire antenna, for example, approximately 20 times the wavelength of the signal being transmitted.

A series of measurements are made for each single column of radiating elements 34, 36, 38 and 40 of the antenna 20, yielding a plot from which phase shifter phase versus voltage information can be obtained. All phase shifters 30 are set to random phases and the tuning voltage for a phase shifter coupled to a first column of radiating elements 34, 36, 38 and 40 is varied in discrete voltage steps while the phase and amplitude is recorded by the receiver 52. This procedure is repeated for each phase shifter 30.

The single column measurements include the step of processing the collected data. The data can be converted from the measured magnitude and phase to complex numbers. The data can then plotted on a real-imaginary graph. The resulting plot can be used to ascertain information about the phase shifter 30 relating voltage to phase shift characteristics. This information can then be used to generate voltage-phase equations, which can be used to build calibration tables for antenna boresight calibration. The phases can also be adjusted to yield a uniform phase front at the aperture of the antenna 20.

The calibration method can be verified through a final antenna measurement. An antenna range is used to take a scan and a farfield plot is calculated. A good calibration will yield a good antenna pattern with symmetric main beam and low sidelobes. Pattern discrepancies can be used as indications of an incomplete calibration.

In the above description, the features of the antenna apply whether it is used for transmitting or receiving. For a passive reciprocal antenna, it is well known that the properties are the same for both the receive or transmit modes. Therefore, no confusion should result from a description that is made in terms of one or the other mode of operation and it is well understood by those skilled in the art that the invention is not limited to one or the other mode.

While the present invention has been described in terms of its preferred embodiments, it will be apparent to those skilled in the art that various changes can be made to the disclosed embodiments without departing from the scope of the invention as set forth in the following claims.

What is claimed is:

1. A method for calibrating a phased array antenna containing a plurality of electronically tunable phase shifters each of which is coupled to a column of radiating elements, said method comprising the steps of:

characterizing, without having any prior phase shift versus tuning voltage data, each of the electronically tunable phase shifters, wherein said characterizing step includes the steps of:

(a) setting each of the electronically tunable phase shifters to a random phase;

(b) successively applying a plurality of tuning voltages to a first one of the phase shifters coupled to a first column of radiating elements;

(c) measuring, at a receiver, phase and amplitude of a signal transmitted from the first column of radiating elements for each tuning voltage applied to the first phase shifter;

(d) determining phase shift versus tuning voltage data for the first column of radiating elements; and repeating steps (b), (c) and (d) for each column of radiating elements after resetting each of the electronically tunable phase shifters to the random phase;

calculating phase offsets for each column of radiating elements using a farfield antenna range and the characterized data for each of the electronically tunable phase shifters; and using the calculated phase offsets in a calibration table to adjust the tuning voltage of each of the electronically tunable phase shifters to cause the columns of radiating elements to yield a uniform beam.

2. The method of claim 1, wherein said calculating step includes:

mounting said phased array antenna in the farfield antenna range including a scanner probe positioned far enough away from the phased array antenna such that the scanner probe receives energy emitted form the phased array antenna.

3. The method of claim 1, wherein said using step includes:

performing a nearfield scan;

producing a azimuth phase hologram plot;

comparing the azimuth phase hologram plot with a desired azimuth phase hologram plot; and adjusting a phase shifter value in the calibration table if the azimuth phase hologram plot differs from the desired azimuth phase hologram plot.

4. The method of claim 3, further comprising the steps of:

performing a farfield scan;

producing a farfield plot;

comparing the farfield plot with a desired farfield plot; and repeating said characterizing step and said calculating step if the farfield plot differs from the desired farfield plot.

5. A method for calibrating a phased array antenna containing a plurality of electronically tunable phase shifters, said method comprising the steps of:

(a) positioning a receiver away from the phased array antenna such that the receiver receives energy emitted from the phased array antenna;

(b) setting each of the electronically tunable phase shifters in the phased array antenna to a random phase;

(c) successively applying a plurality of tuning voltages to a first one of the electronically tunable phase shifters coupled to a first column of radiating elements in the phased array antenna to control the phase shift provided for the first column of radiating elements;

(d) measuring phase and amplitude of a signal transmitted from the first column of radiating elements in the phased array antenna to the receiver for each tuning voltage applied to the first electronically tunable phase shifter;

(e) determining phase shift versus tuning voltage data for the first column of radiating elements;

(f) repeating steps (c), (d) and (e) for each column of radiating elements after resetting each of the electronically tunable phase shifters to the random phase; and (g) using the determined phase shift versus tuning voltage data to adjust the phase shift for each of the electronically tunable phase shifters to yield a uniform phase front at an aperture of the phased array antenna.

6. The method of claim 5, wherein the tuning voltages are applied in discrete increments.

7. The method of claim 5, wherein the step of measuring phase and amplitude of a signal transmitted from the first column of radiating elements in the phased array antenna to the receiver for each tuning voltage applied to the first phase shifter comprises the steps of:

converting the measured phase and amplitude to complex numbers;

plotting the complex numbers on a real-imaginary graph.

8. The method of claim 5, wherein the step of determining phase shift versus tuning voltage data for the first column of radiating elements comprises the steps of:

generating voltage-phase equations; and using the generated equations to construct an antenna boresight calibration table.

9. The method of claim 5, wherein the step of using the determined phase shift versus tuning voltage data to adjust the phase shift for each of the electronically tunable phase shifters to yield a uniform phase front at the aperture of the phased array antenna comprises the steps of:

performing a nearfield scan of the phased array antenna;

producing a azimuth phase hologram plot;

comparing the azimuth phase hologram plot with a desired azimuth phase hologram plot; and adjusting a phase shifter value in a calibration table if the azimuth phase hologram plot differs from the desired azimuth phase hologram plot.

10. The method of claim 9, further comprising the steps of:

performing a farfield scan of the phased array antenna;

producing a farfield plot;

comparing the farfield plot with a desired farfield plot; and repeating steps (b), (c), (d), (e), (f) and (g) if the farfield plot differs from the desired farfield plot.

11. A phased array antenna containing a plurality of electronically tunable phase shifters each of which is coupled to a column of radiating elements, said phased array antenna is calibrated by performing the following steps:

(a) positioning a receiver away from the phased array antenna such that the receiver receives energy emitted from the phased array antenna;

(b) setting each of the electronically tunable phase shifters in the phased array antenna to a random phase;

(c) successively applying a plurality of tuning voltages to a first one of the electronically tunable phase shifters coupled to a first column of radiating elements in the phased array antenna to control the phase shift provided for the first column of radiating elements;

(d) measuring phase and amplitude of a signal transmitted from the first column of radiating elements in the phased array antenna to the receiver for each tuning voltage applied to the first electronically tunable phase shifter;

(e) determining phase shift versus tuning voltage data for the first column of radiating elements;

(f) repeating steps (c), (d) and (e) for each column of radiating elements after resetting each of the electronically tunable phase shifters to the random phase; and (g) using the determined phase shift versus tuning voltage data to adjust the phase shift for each of the electronically tunable phase shifters to yield a uniform phase front at an aperture of the phased array antenna.

12. The phased array antenna of claim 11, wherein the tuning voltages are applied in discrete increments.

13. The phased array antenna of claim 11, wherein the step of measuring phase and amplitude of a signal transmitted from the first column of radiating elements in the phased array antenna to the receiver for each tuning voltage applied to the first phase shifter comprises the steps of:

converting the measured phase and amplitude to complex numbers;

plotting the complex numbers on a real-imaginary graph.

14. The phased array antenna of claim 11, wherein the step of determining phase shift versus tuning voltage data for the first column of radiating elements comprises the steps of:

generating voltage-phase equations; and using the generated equations to construct an antenna boresight calibration table.

15. The phased array antenna of claim 11, wherein the step of using the determined phase shift versus tuning voltage data to adjust the phase shift for each of the electronically tunable phase shifters to yield a uniform phase front at the aperture of the phased array antenna comprises the steps of:

performing a nearfield scan of the phased array antenna;

producing a azimuth phase hologram plot;

comparing the azimuth phase hologram plot with a desired azimuth phase hologram plot; and adjusting a phase shifter value in a calibration table if the azimuth phase hologram plot differs from the desired azimuth phase hologram plot.

16. The phased array antenna of claim 15, further comprising the steps of:

performing a farfield scan of the phased array antenna;

producing a farfield plot;

comparing the farfield plot with a desired farfield plot; and repeating steps (b), (c), (d), (e), (f) and (g) if the farfield plot differs from the desired farfield plot.

17. The phased array antenna of claim 11, wherein said calibrated phased array antenna is used in a satellite communication system.

18. The phased array antenna of claim 11, wherein said calibrated phased array antenna is used in a microwave terrestrial communication system.

19. The phased array antenna of claim 11, wherein said electronically tunable phase shifters are located in a different plane than the radiating elements.

20. The phased array antenna of claim 11, wherein two adjacent columns of radiating elements are separated from one another by 0.5 to 1 $\lambda$ of the signal transmitted by the calibrated phased array antenna.

* * * * *